(12) United States Patent
Shim et al.

(10) Patent No.: US 9,128,215 B2
(45) Date of Patent: Sep. 8, 2015

(54) OPTICAL STRUCTURE AND BACKLIGHT UNIT

(71) Applicant: Samsung Display Co., Ltd., Yongin, Gyeonggi-Do (KR)

(72) Inventors: Sung-Kyu Shim, Seoul (KR); Kang-Woo Lee, Seoul (KR); In Sun Hwang, Suwon-si (KR); Do Hun Kim, Masan-si (KR); Hyoung-Joo Kim, Anyang-si (KR); Tae Yong Ryu, Hwaseong-si (KR)

(73) Assignee: SAMSUNG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/060,851

(22) Filed: Oct. 23, 2013

(65) Prior Publication Data
US 2014/0376208 A1  Dec. 25, 2014

(30) Foreign Application Priority Data
Jun. 19, 2013  (KR) .................. 10-2013-0070301

(51) Int. Cl.
| | |
|---|---|
| *F21V 3/00* | (2015.01) |
| *F21V 5/00* | (2015.01) |
| *G02B 3/00* | (2006.01) |
| *G02F 1/1335* | (2006.01) |

(52) U.S. Cl.
CPC .............. *G02B 3/00* (2013.01); *G02F 1/133606* (2013.01); *G02F 1/133603* (2013.01); *G02F 2001/133607* (2013.01)

(58) Field of Classification Search
CPC ................ G02B 3/00; G02F 1/133603; G02F 2001/133607; G02F 1/133606
USPC ....................................... 362/249.02
See application file for complete search history.

(56) References Cited

U.S. PATENT DOCUMENTS

| | | | | |
|---|---|---|---|---|
| 5,404,869 | A * | 4/1995 | Parkyn et al. ................. | 126/699 |
| 5,806,955 | A * | 9/1998 | Parkyn et al. ................. | 362/612 |
| 6,819,506 | B1 * | 11/2004 | Taylor et al. ................. | 359/726 |
| 7,572,654 | B2 * | 8/2009 | Chang ............................ | 438/29 |
| 7,901,113 | B2 * | 3/2011 | Kim et al. ..................... | 362/328 |
| 8,303,137 | B2 * | 11/2012 | Paik et al. ..................... | 362/294 |
| 8,814,385 | B2 * | 8/2014 | Onaka et al. .................. | 362/244 |
| 2002/0080615 | A1 * | 6/2002 | Marshall et al. .............. | 362/333 |
| 2005/0243570 | A1 * | 11/2005 | Chaves et al. ................. | 362/551 |
| 2006/0077667 | A1 | 4/2006 | Lui et al. | |
| 2006/0238884 | A1 * | 10/2006 | Jang et al. ..................... | 359/653 |
| 2009/0067180 | A1 * | 3/2009 | Tahmosybayat .............. | 362/339 |
| 2009/0296388 | A1 * | 12/2009 | Wu et al. ....................... | 362/235 |

(Continued)

FOREIGN PATENT DOCUMENTS

| | | |
|---|---|---|
| KR | 100593933 B1 | 6/2006 |
| KR | 100717319 B1 | 5/2007 |
| KR | 1020100099031 A | 9/2010 |
| KR | 101149580 B1 | 5/2012 |
| KR | 1020120108278 A | 10/2012 |

*Primary Examiner* — Donald Raleigh
(74) *Attorney, Agent, or Firm* — Cantor Colburn LLP

(57) ABSTRACT

An optical structure includes a body facing a light emitting surface of a light emitting diode package and including a portion protruding toward the light emitting surface of the light emitting diode package, where a surface of the protruding portion faces the light emitting surface and forms a reflective surface of the optical structure; and a leg elongated from a periphery of the body toward the point light source, where the leg supports the body to be spaced apart from the light emitting diode package.

21 Claims, 18 Drawing Sheets

(56) References Cited

U.S. PATENT DOCUMENTS

| | | | |
|---|---|---|---|
| 2012/0087122 A1* | 4/2012 | Takeuchi et al. | 362/235 |
| 2012/0127728 A1 | 5/2012 | Chang | |
| 2013/0021798 A1 | 1/2013 | Chen et al. | |
| 2013/0279173 A1* | 10/2013 | Takeuchi et al. | 362/296.01 |
| 2013/0292554 A1* | 11/2013 | Meinherz et al. | 250/221 |

* cited by examiner

OPTICAL STRUCTURE AND BACKLIGHT UNIT

This application claims priority to Korean Patent Application No. 10-2013-0070301 filed on Jun. 19, 2013, and all the benefits accruing therefrom under 35 U.S.C. §119, the entire contents of which are incorporated herein by reference.

BACKGROUND (a) Field

The invention relates to an optical structure, and more particularly, to an optical structure which is used to distribute light emitted from a light source of a direct type light emitting diode ("LED") backlight unit and a backlight unit including the same.

(b) Description of the Related Art

A liquid crystal display ("LCD") is one of flat panel displays which are widely used. In general, in a display panel of the LCD, a liquid crystal material is injected between an upper substrate on which a common electrode and a color filter are disposed, and a lower substrate on which a thin film transistor and a pixel electrode are disposed. Different electrical potentials are applied to the pixel electrode and the common electrode to generate an electric field to change the alignment of liquid crystal molecules in the liquid crystal material and adjust light transmittance to display an image on the display panel.

As a liquid crystal display panel of the LCD is a non-emissive light device, a backlight unit is generally equipped in the LCD to provide light to the liquid crystal display panel from the lower part of the liquid crystal display panel.

In the backlight unit, a cold cathode fluorescent lamp ("CCFL") and a light emitting diode ("LED") are generally used as a light source. In the related art, the CCFL which provides bright white light with low power consumption is mainly used. However, usage of an LED which has advantages such as excellent color reproducibility, long life-span, and low power consumption as compared with the CCFL, is being increased.

The backlight unit is classified into an edge type and a direct type in accordance with a position of the light source with respect to the liquid crystal display panel. In the edge type, a light source is disposed at a side of the liquid crystal display panel to provide light through a side of a light guide. In the direct type, the light source is disposed at a rear side of the liquid crystal display panel to provide light to the liquid crystal display panel. The direct type backlight unit has advantages of high light utilization coefficient, simple treatment, no limitation of size of the display panel, and relatively cheap cost, in comparison with the edge type backlight unit.

SUMMARY

One or more exemplary embodiment of the invention provides an optical structure which may replace a lens in a direct type LED backlight unit and a backlight unit including the same.

One or more exemplary embodiment of the invention provides an optical structure which is provided so as to be disposed at a light emitting surface of an LED package in the direct type LED backlight unit. The optical structure is essentially applied to reflect and diffuse the LED light to distribute the light.

An exemplary embodiment of the invention provides an optical structure including: a body facing a light emitting surface of a light emitting diode package and including a portion protruding toward the light emitting surface of the light emitting diode package, where a surface of the protruding portion faces the light emitting surface and forms a reflective surface of the optical structure; and a leg elongated from a periphery of the body toward the point light source, where the leg supports the body to be spaced apart from the light emitting diode package.

The reflective surface may be symmetrical with respect to a vertical central axis of the optical structure.

The reflective surface may be a curved surface of which an absolute value of a slope increases in a direction towards a distal end of the protruding portion.

The reflective surface may define a relationship between a beam angle $\theta$ of the light and a design angle $\alpha$ of the reflective surface which satisfies the Equation: $(60-\theta)/2 \leq \alpha \leq (120-\theta)/2$, where the beam angle $\theta$ of the light is defined as an angle between a straight line which is directed to an arbitrary point on the reflective surface from a center of the light emitting surface and the vertical central axis of the optical structure, and the design angle $\alpha$ of the reflective surface is defined as an angle between a straight line which is directed from the arbitrary point of the reflective surface and a line tangent to the reflective surface at the arbitrary point.

The reflective surface may be a curved surface of which an absolute value of a slope is one of constant or increases, and then decreases, in a direction towards a distal end of the protruding portion.

In a section of the curved surface where the absolute value of the slope of the reflective surface is one of constant or increases, the reflective surface may define a relationship between a beam angle $\theta$ of the light and a design angle $\alpha$ of the reflective surface which satisfies the Equation: $(60-\theta)/2 \leq \alpha \leq (120-\theta)/2$, where the beam angle $\theta$ of the light is defined as an angle between a straight line which is directed to an arbitrary point on the reflective surface from a center of the light emitting surface and the vertical central axis of the optical structure, and the design angle $\alpha$ of the reflective surface is defined as an angle between a straight line which is directed from the arbitrary point of the reflective surface and a line tangent to the reflective surface at the arbitrary point.

The reflective surface may have a structure of a Fresnel lens.

The body of the optical structure may include an optical reflective material combined with a resin, or a resin body having a protruding portion and the optical reflective material on an external surface of the protruding portion of the resin body.

A reflectance of the reflective surface may be 60% or higher.

In a cross-section, an upper surface of the body opposing a distal end of the protruding portion may be curved or uneven.

In the body, a width in a first direction which is a horizontal direction of a first vertical plane which passes through a vertical central axis of the optical structure may be smaller than a length in a second direction which is a horizontal direction of a second vertical plane which passes through the vertical central axis and perpendicular to the first vertical plane.

The reflective surface may be symmetrical with respect to the first vertical plane and may be symmetrical with respect to the second vertical plane.

The reflective surface may be a curved surface of which an absolute value of a slope increases in a direction towards a distal end of the protruding portion.

The reflective surface may be a curved surface of which an absolute value of a slope in the first horizontal direction is one of constant or increases, and then decreases, in a direction towards a distal end of the protruding portion, and in the second horizontal direction is one of constant or increases and then decreases, or is one of constant or increases, then decreases and then is constant, in the direction towards the distal end of the protruding portion.

In a section of the curved surface where the absolute value of the slope of the reflective surface is one of constant or increases, the reflective surface may define a relationship between a beam angle θ of the light and a design angle α of the reflective surface which satisfies the Equation: $(60-\theta)/2 \leq \alpha \leq (120-\theta)/2$, where the beam angle θ of the light is defined as an angle between a straight line which is directed to an arbitrary point on the reflective surface from a center of the light emitting surface and the vertical central axis of the optical structure, and the design angle α of the reflective surface is defined as an angle between a straight line which is directed from the arbitrary point of the reflective surface and a line tangent to the reflective surface at the arbitrary point.

The reflective surface may have a structure of a Fresnel lens.

The body of the optical structure may include an optical reflective material combined with a resin, or a resin body having a protruding portion and the optical reflective material on an external surface of the protruding portion of the resin body. A reflectance of the reflective surface is 60% or higher.

Another exemplary embodiment of the invention provides a direct type light emitting diode backlight unit including: a substrate; a light emitting diode package on the substrate; an optical structure which is disposed above the light emitting diode package so as to be spaced apart from the light emitting diode package; and an optical sheet which is disposed above the optical structure. The optical structure includes: a body facing a light emitting surface of the light emitting diode package and including a portion protruding toward the light emitting surface of the light emitting diode package, where a surface of the protruding portion faces the light emitting surface and forms a reflective surface of the optical structure; and a leg elongated from a periphery of the body and toward the light emitting diode package, where the leg supports the body to be spaced apart from the light emitting diode package.

In the body, a width in a first direction which is a horizontal direction of a first vertical plane which passes through a vertical central axis of the optical structure may be smaller than a length in a second direction which is a horizontal direction of a second vertical plane which passes through the vertical central axis and perpendicular to the first vertical plane.

The light emitting diode backlight unit may further include a plurality of light emitting diode packages, and one optical structure may cover a plurality of light emitting diode packages.

The optical structure may be mounted on the substrate via of the leg.

In exemplary embodiments of the invention, other features of the optical structure described above may be applied to a direct type light emitting diode backlight unit.

One or more exemplary embodiment of the optical structure according to the invention may be used as a light distribution means which distributes light emitting diode light in the direct type light emitting diode backlight unit. Particularly, the optical structure can be used in a high intensity light emitting diode package or a high color reproduction light emitting diode package to which applying a conventional optical lens would be difficult.

The optical structure includes a material which is cheaper than that of the optical lens, for example, a normal grade resin rather than an optical grade resin so that the one or more exemplary embodiment of the optical structure according to the invention may be manufactured by an ordinary injection molding, thereby saving cost. One or more exemplary embodiment of the optical structure according to the invention may also be mounted by using an installation which has been used for mounting the conventional optical lens of the related art.

BRIEF DESCRIPTION OF THE DRAWINGS

The above and other features of this disclosure will become more apparent be describing in further detail exemplary embodiments thereof with reference to the accompanying drawings, in which:

In FIG. 12, a design angle of a reflective surface is 15 degrees. In FIG. 13, a design angle of a reflective surface is 30 degrees. In FIG. 14, a design angle of a reflective surface is 45 degrees.

DETAILED DESCRIPTION

Figure 1:
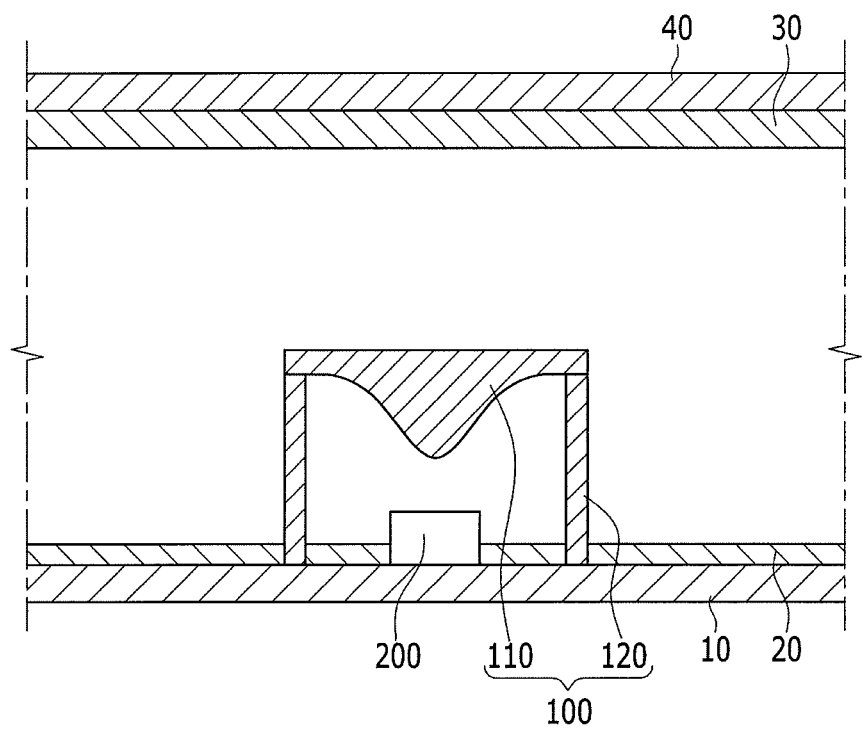
FIG. 1 is a partial cross-sectional view schematically illustrating an exemplary embodiment of a direct type light emitting diode ("LED") backlight unit which includes an optical structure according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. As used herein, the term "and/or" includes any and all combinations of one or more of the associated listed items.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A liquid crystal display ("LCD") device may include a backlight unit. The backlight unit may include a point light source such as a light emitting diode ("LED") package which includes an LED generating light. When the LED is used as a light source of a direct type backlight unit, in order not to concentrate LED light, which travels in a straight line, above a light emitting surface of the LED package, but to distribute the LED light on an entirety of a liquid crystal display panel, an optical lens is provided above the light emitting surface of the LED package to refract the LED light.

In order to save cost and increase efficiency of manufacturing the LCD, the number of LED packages provided in the LCD is reduced. To reduce the number of LED packages, an LED package of a larger size and/or higher intensity has been developed. The larger size, higher intensity LED package may include a lens which has a size corresponding to the increased light emitting surface of the LED package.

However, as the size of the lens increases, a cost for manufacturing the lens significantly increases, and an increase of the thickness of the lens causes an increase of the overall thickness of the backlight unit including the LED package. Further, when a high color reproduction LED package is used, color separation phenomenon occurs on a top surface of the lens due to a difference in a region where each color light component is emitted in the LED package. Therefore, applying the lens in large size, high intensity and/or high color reproduction LED packages, may be difficult. Therefore, there remains a need for an improved LED package having a relatively large size, high intensity and high color reproduction.

Hereinafter, the invention will be described in detail with reference to the accompanying drawings.

Now, an exemplary embodiment of an optical structure of a direct type LED backlight unit according to the invention will be described in detail with reference to drawings.

FIG. 1 is a partial cross-sectional view schematically illustrating an exemplary embodiment of a direct type LED backlight unit which includes an optical structure according to the invention. Referring to FIG. 1, a substrate 10, a reflective sheet 20, an LED package 200, an optical structure 100, a diffusion plate 30, and one or more optical sheet 40 are disposed from a lower side to an upper side. The entire structure of the backlight unit including other components and a connecting relationship with a liquid crystal display panel are well known in the art, and further description is therefore omitted for convenience of explanation. Therefore, only components which are illustrated in FIG. 1 will be described here in detail.

The LED package 200 serving as a light source is mounted on a top surface of the substrate 10. The substrate 10 may be a printed circuit board ("PCB"). The optical structure 100 is mounted on the substrate 10 so as to be substantially spaced apart from the top surface of the LED package 200 and cover the LED package 200. Accordingly, as seen from a lateral direction (e.g., horizontal in FIG. 1), the LED package 200 and the optical structure 100 are observed to be separated from each other with respect to a same vertical axis with respect to the substrate 10. In contrast, the LED package 200 is blocked by the optical structure 100 when the as seen from an upper direction (e.g., from a top of FIG. 1) so that the LED package 200 is not observed.

In a direct type LED backlight unit of the related art, a lens is disposed on the LED package 200 in order to refract and diffuse the LED light. In contrast, in one or more exemplary embodiment of the invention, a specifically designed optical structure 100 is disposed.

The optical structure 100 includes a body 110 which has a reflective surface facing the LED package 200, and support portions (otherwise referred to as legs) 120 which supports the body 110 so that the body 110 is spaced apart from the LED package 200. Essentially, the optical structure 100 laterally reflects the LED light which upwardly travels, to diffuse the LED light.

Several to several tens of LED packages 200 may be mounted on the substrate 10 having a predetermined size at a predetermined interval, in accordance with a size of the liquid crystal display panel, a luminance required for the liquid crystal display, and/or a size of a light emitting surface of the LED package. In one exemplary embodiment, for example, approximately 20 to 25 high intensity LED packages each having a light emitting surface having a length W of 5.9 millimeters (mm) and a width D of 2.5 mm, may be mounted in a 40 inch liquid crystal display panel.

As the LED package 200, a white LED package which emits white light may be used, or red, green and blue LED packages may to be used in combination. The LED package 200 may be a high intensity or ultra intensity LED package having a large light emitting surface. The LED package 200 may be, for example, a high color reproduction LED package which emits green and magenta light. The LED package 200 may include one or more LED chips (not shown).

A number of optical structures 100 may correspond to a number of the LED packages 200 mounted on the substrate 10 so as to cover the LED packages 200. The optical structures 100 may be in one-to-one correspondence with the LED packages 200 or one optical structure 100 may be mounted so as to cover a plurality of LED packages 200. Where one optical structure 100 covers a plurality of LED packages 200, a total number of optical structures 100 mounted in the substrate 10 may be smaller than a total number LED packages 200 mounted in the substrate 10.

A diffusion plate 30 for diffusing the light toward the liquid crystal display panel (not illustrated), and a plurality of optical sheets 40 are disposed above the optical structure 100. The optical sheets 40 may include a prism sheet for adjusting a light traveling direction and a reflective polarizing sheet for increasing a luminance efficiency of a LCD device, and such optical sheets are well known in the art. In general, the light which is upwardly emitted from the light emitting surface of the LED package 200 is laterally reflected by the optical structure 100 and then finally irradiated onto the liquid crystal display panel (not illustrated) via the diffusion plate 30 and the plurality of optical sheets 40.

The reflective sheet 20 may be disposed on the substrate 10. A hole may be defined in a position of the reflective sheet 20 on which the LED package 200 is located so as to mount the LED package 200 on the substrate 10 via the hole. The reflective sheet 20 reflects the light emitted from the LED package 200, and the light reflected by the optical structure 100 or the diffusion plate 30, to be finally directed to the diffusion plate 30 to increase luminance efficiency.

Hereinafter, exemplary embodiments of an optical structure according to the invention will be described in detail with reference to FIGS. 2 to 18.

Figure 2:
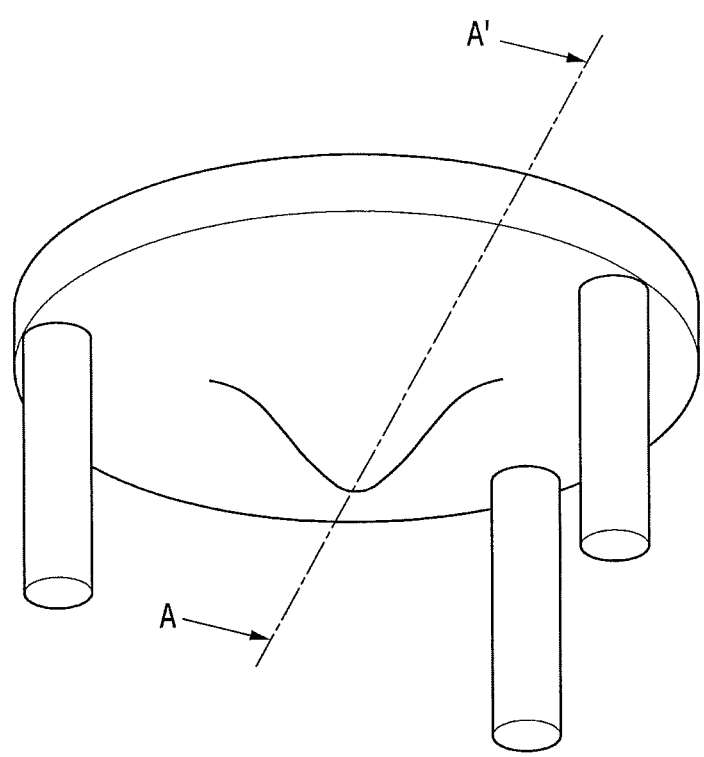
FIG. 2 is a perspective view of an exemplary embodiment of an optical structure according to the invention.
Figure 3:
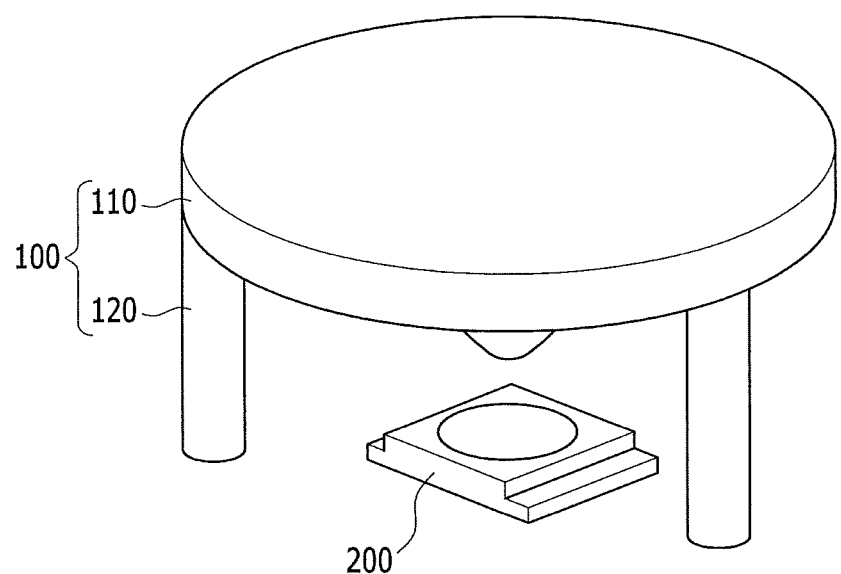
FIG. 3 is a diagram illustrating an exemplary embodiment of an installation position of the optical structure of FIG. 2 in relation to an LED package.
Figure 4:
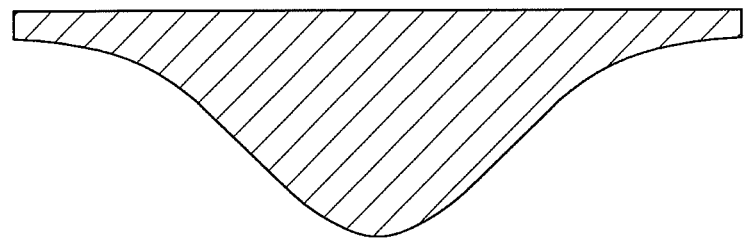
FIG. 4 is a cross-sectional view of the optical structure of FIG. 2, taken along line A-A'.

FIG. 2 is a perspective view of an exemplary embodiment of an optical structure according to the invention, FIG. 3 is a diagram illustrating an exemplary embodiment of an installation position of the optical structure of FIG. 2 in relation to a LED package, and FIG. 4 is a cross-sectional view taken along line A-A' of the optical structure of FIG. 2.

The optical structure 100 includes a body 110 and legs 120. The body 110 has a three dimensional shape which protrudes toward a light emitting surface of the LED package 200. In one exemplary embodiment, for example, the body 110 may have a shape similar to a circular cone whose peak is protruded toward a bottom of the backlight unit, as illustrated in the drawings. That is, a portion of the body 110 protrudes in a direction opposite to a travel direction of the light from the LED package 200. When the optical structure 100 is viewed in a direction from the top to the bottom in FIGS. 2 to 4, the body 110 has a circular shape having a constant curvature, but the invention is not limited thereto. In an alternative exemplary embodiment, for example, the body 110 may have an oval shape or a polygonal shape in a plan view. When the body 110 has a polygonal planar shape, apexes or corners thereof may be rounded.

The legs 120 may be a columnar shape which downwardly extends from the body 110, at approximately a periphery (e.g., near a boundary) of the body 110. The legs 120 may have a length such that a lower end of the body 110 is spaced apart from the light emitting surface of the LED package 200 by a predetermined height. In the drawings, even though three legs 120 are shown, the number of legs may be increased or decreased in accordance with a design of the LCD.

The legs 120 may be relatively thin in planar dimension such as in the plan view, so as to minimize interference with or blocking of a route of the light which is reflected from the reflective surface of the body 110 as much as possible. A leg 120 may have a circular cylindrical shape so as to broadly diffuse the light when the light reaches the reflective surface of the body 110. A distal end portion of each leg 120 may be attached to be fixed to a designated position of an upper surface of the substrate 10, such that a vertical central axis of the optical structure 100 may coincide or align with a center of the light emitting surface of the LED package 200.

A downward extending external surface of the body 110, which is the protruding surface of the body 110, forms a reflective surface of the optical structure 100. As illustrated in FIG. 4, with respect to a vertical central axis of the optical structure 100, the reflective surface may be symmetrical with respect to the vertical central axis of the optical structure 100. The vertical central axis may be defined as a vertical line which passes through a lowest portion of the body 110 or a vertical line which passes through a center of the upper surface (e.g., a circle in FIG. 4) as seen from the upper side of the optical structure 100. Expressed in another way, in the body 110, a width in a first direction which is a horizontal direction of a first vertical plane which passes through the vertical central axis of the optical structure is smaller than a length in a second direction which is a horizontal direction of a second vertical plane which passes through the vertical central axis and perpendicular to the first vertical plane. The reflective surface is symmetrical with respect to the first vertical plane and is symmetrical with respect to the second vertical plane.

However, the reflective surface may be asymmetrical with respect to the vertical central axis of the optical structure 100, depending on a relationship of the optical structure 100 with a mounting position on the substrate 10 and/or an adjacent optical structure 100. An upper external surface of the body 110 is substantially flat but the invention is not limited thereto. In one exemplary embodiment, for example, the upper external surface may be curved or uneven.

The lowest part of the reflective surface corresponding to the lowest part of the body 110 may have a pointed distal end (e.g., may be sharp), but the distal end may instead be rounded as illustrated in FIG. 4. When the lowest part of the body 110 is rounded, even though the optical structure 100 is provided such that the central axis thereof is not exactly aligned with the center of the light emitting surface of the LED package 200, the light is reflected in various directions to the surroundings of the body 110 by the rounded lowest part of the reflective surface so as to be diffused or reflected again, which may reduce concentration of light in one direction.

The reflective surface of the optical structure 100 may have a substantially "V" shape in a cross-section, but at least a predetermined portion thereof may be curved or the slope may be discontinuous. In one exemplary embodiment, for example, as illustrated in FIG. 4, the reflective surface may have a curved surface having an absolute value of a slope which is increased and then decreased as the curved surface approaches a lower portion nearest to the light emitting surface of the LED package 200. In another exemplary embodiment, the reflective surface may be a curved surface having an absolute value of a slope which is increased as it approaches the lower portion or is constant, and then decreased as it approaches the lower portion. When the light emitting surface is a curved surface having the absolute value of the slope which is increased as it approaches the lowest part, the LED light may be reflected so as to be more uniformly diffused.

Figure 5:
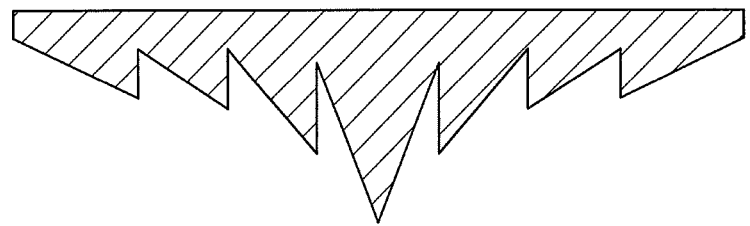
FIG. 5 is a cross-sectional view of a modified exemplary embodiment of the optical structure of FIG. 2, taken along line A-A'.

FIG. 5 is a cross-sectional view of a modified exemplary embodiment of the optical structure of FIG. 2, taken along line A-A'. The reflective surface of the optical structure 100 may have a shape of a Fresnel lens as illustrated in FIG. 5. Where the optical structure 100 has the shape of the Fresnal lens, a cross-sectional thickness of the body 110 is reduced and thus a total thickness of the optical structure 100 is reduced so as to manufacture a thinner backlight unit including the optical structure.

The reflective surface of the optical structure 100 may have a relatively high reflectance in order to reduce an optical loss. In one exemplary embodiment, the reflectance of the optical structure is 60% or higher. For this reason, the optical structure 100 may include a material in which a light reflective material and a resin are combined. In one exemplary embodiment, for example, the optical structure 100 may include an optical reflective material such as titanium dioxide in combination with a plastic material which is good for a molding process, such as polycarbonate ("PC"), polystyrene ("PS:) or acryl.

An exemplary embodiment of a method of manufacturing the optical structure 100 may include an injection molding process. Alternatively, the resin is injection-molded to form an entire external shape of the optical structure 100, and the optical reflective material such as a metal is applied or coated on an external surface of the protruding portion of optical structure 100 to form the reflective surface. The latter may include an additional process after an injection molding process but is advantageous in that a reflective surface having a higher reflectance is achieved.

Even though in the above-described exemplary embodiments, a portion of the body has a shape similar to a circular cone shape, the protruding portion of the body may have a shape similar to a polypyramidal shape such as a triangular pyramid or a quadrangular pyramid. In one exemplary embodiment, the body may have a three-dimensional shape which is similar to a regular polypyramidal shape. In the polypyramidal shape, corners formed by adjacent inclined surfaces may be rounded, which is advantageous to uniformly diffuse the light.

Figure 6:
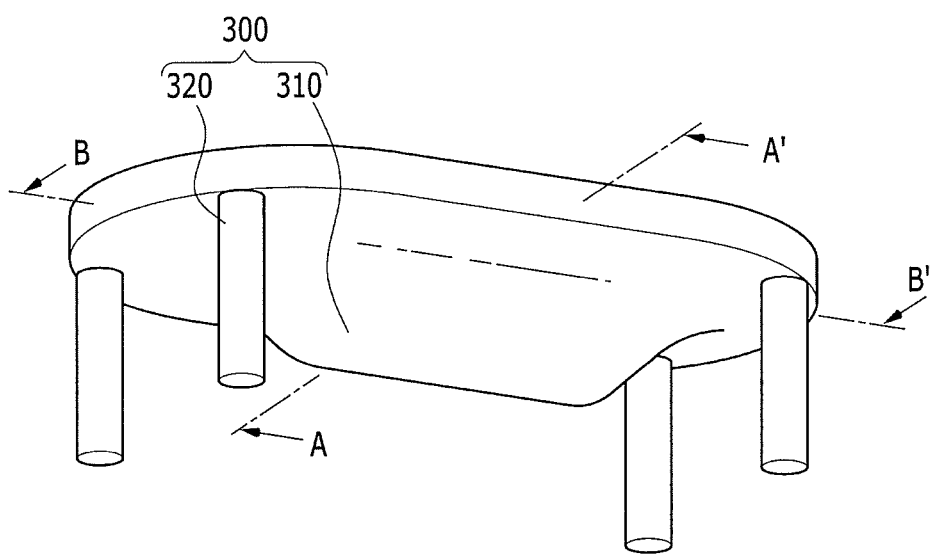
FIG. 6 is a perspective view of another exemplary embodiment of an optical structure according to the invention.
Figure 7:
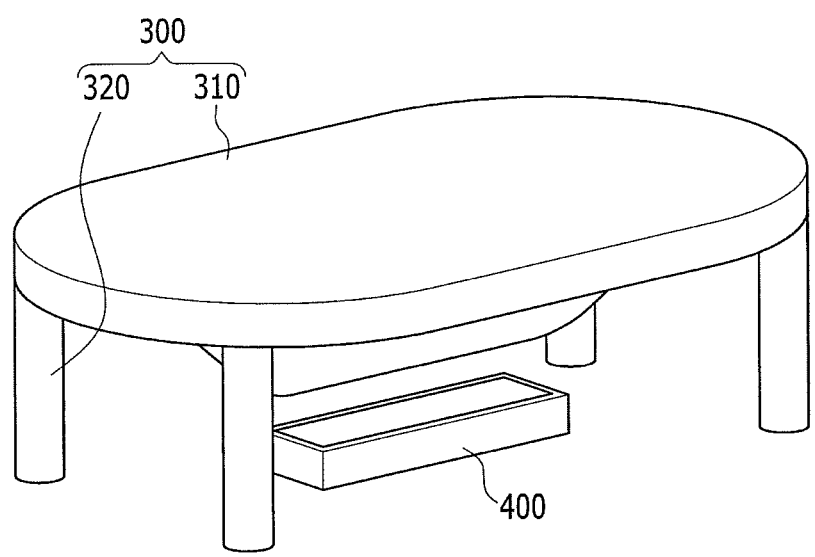
FIG. 7 is a diagram illustrating an exemplary embodiment of an installation position of the optical structure of FIG. 6 in relation to an LED package.

Now, another exemplary embodiment of an optical structure according to the invention will be described with reference to FIGS. 6 to 9. Specifically, different portions from the exemplary embodiment of FIGS. 2 to 5 will be mainly described. FIG. 6 is a perspective view of another exemplary embodiment of an optical structure according to the invention, FIG. 7 is a diagram illustrating an exemplary embodiment of an installation position of the optical structure of FIG. 6 in relation to an LED package, FIG. 8 is a cross-sectional view taken along line B-B' of the optical structure of FIG. 6, and FIG. 9 is a cross-sectional view of a modified exemplary of the optical structure of FIG. 6 taken along line B-B'.

An optical structure 300 illustrated in FIG. 6 has an overall asymmetrical shape in which a length is different from a width, as seen from the upper side of the optical structure 300. In other words, the length of the optical structure 300 is larger than the width, which is different from the exemplary embodiment of the optical structure 100 illustrated in FIG. 2. The asymmetrical shape of the optical structure 300 may correspond to a shape of a light emitting surface of an LED package 400 which is disposed below the optical structure 300. That is, as illustrated in FIG. 7, the light emitting surface of the LED package 400 has a rectangular shape in which a length is larger than a width. Thus, the optical structure 300 has an overall shape which is similar to a rectangular pyramid in which the length is larger than the width in order to cover the LED package 400. The optical structure 300 has a shape in which both of opposing ends in a length direction are semicircular and both of opposing ends in a width direction have a straight shape as seen from the upper side (e.g., in a plan view of the optical structure 300), which is advantageous to uniformly diffuse the light of the rectangular LED package 400.

The optical structure 300 includes a body 310 and legs 320. The body 310 has a three dimensional shape which protrudes toward a light emitting surface of the LED package 400. In the exemplary embodiment, four legs 320 are provided. The leg 320 may be a columnar shape which downwardly extends from the body 310 at approximately a periphery of the body 310. The legs 320 may have a length such that a lower end of the body 310 is spaced apart from the light emitting surface of the LED package 400 by a predetermined height, and the lengths of the legs are equal to each other. A downward extending external surface of the body 310 forms a reflective surface of the optical structure 300, and at least a predetermined portion of the reflective surface may be formed to be curved.

Figure 8:
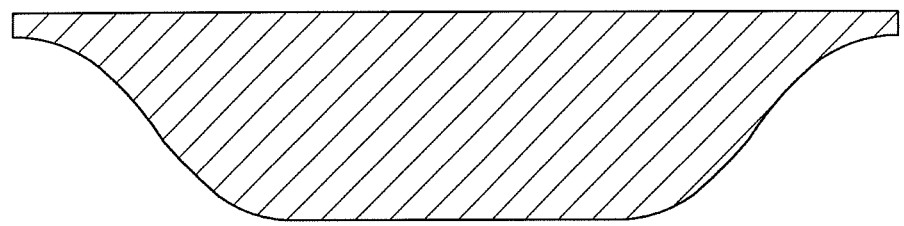
FIG. 8 is a cross-sectional view of the optical structure of FIG. 6, taken along line B-B'.
Figure 9:
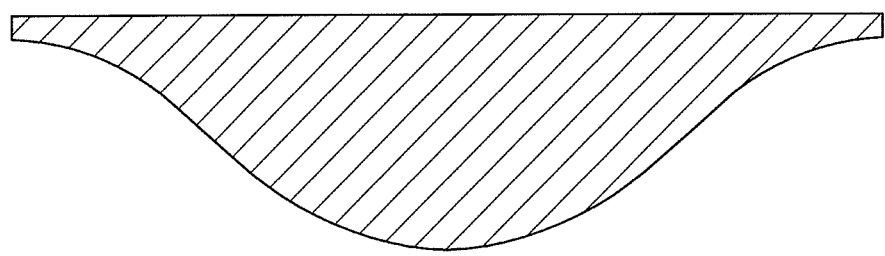
FIG. 9 is a cross-sectional view of a modified exemplary of the optical structure of FIG. 6, taken along line B-B'.

A vertical cross-section taken along A-A' of FIG. 6 corresponding to a width direction of the LED package 400 may be the same as the cross-section illustrated in FIG. 4, but a vertical cross-section taken along B-B' of FIG. 6 corresponding to a length direction of the LED package 400 may have a shape which is similar to a basin as illustrated in FIG. 8. That is, the reflective surface of the optical structure 300 may have a flat bottom and curved side surfaces. Taken from the body 310, an absolute value of a slope of the reflective surface of the body 310 is gradually increased towards a lower portion nearest the light emitting surface of the LED package 400, gradually decreased near the lower portion, and then becomes zero at the lower portion to form the flat bottom.

FIG. 9 is a cross-sectional view of a modified exemplary of the optical structure of FIG. 6, taken along line B-B'. Taken from the body 320, as illustrated in FIG. 9, the absolute value of the slope of the reflective surface is gradually increased and then gradually decreased in a direction towards the lower portion to form a minimally curved line near the lower portion.

Figure 10:
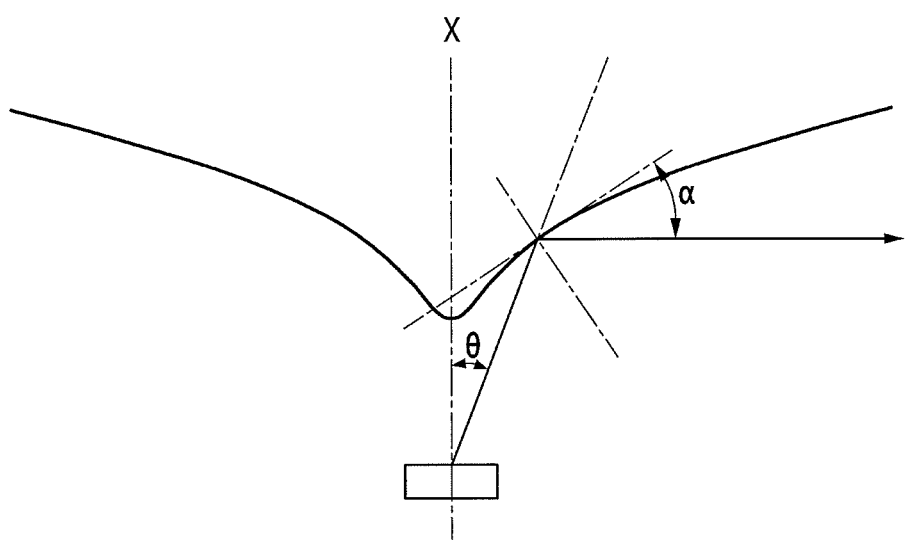
FIG. 10 is a diagram illustrating a design angle of a reflective surface in an exemplary embodiment of an optical structure according to the invention.

FIG. 10 is a diagram illustrating a design angle of a reflective surface in an exemplary embodiment of an optical structure according to the invention. In FIG. 10, θ refers to a light beam angle and α refers to a design angle of the reflective surface. The light beam angle θ may be defined as an angle between a straight line which is directed to an arbitrary point on the reflective surface from a center of the light emitting surface of the LED which is a light source, and a vertical central axis X of the optical structure. The design angle α may be defined as an angle between a straight line which is directed from the arbitrary point of the reflective surface and a line tangent to the reflective surface at the arbitrary point.

In order to reflect the light emitted from the LED which is a light source so as to scatter the light as wide as possible, if it is assumed that the LED light is reflected from the reflective surface of the optical structure to horizontally travel, the design angle α of the reflective surface may be determined by the beam angle θ which is directed from the center of the light source to the reflective surface. The design angle α of the reflective surface may be defined by the following Equation using the above relationship.

$$\alpha=(90-\theta)/2.$$

The reflective surface may be designed to allow the reflected light not only to horizontally travel but also to travel in a range of about ±30 degrees. Considering the reflected light travels in a range of about ±30 degrees, the design angle α of the reflective surface in accordance with the beam angle θ of the light may be represented by the following Equation:

$$(60-\theta)/2 \le \alpha \le (120-\theta)/2.$$

Now, a result of simulating that the light is diffused using an optical structure having the simplest structure according to the invention will be described. FIGS. 11 to 14 are diagrams illustrating simulations in which LED light of an ultra-intensity LED package having a light emitting surface having a length W of 12.5 mm and a width D of 10 mm is diffused to an area corresponding to a display panel size of approximately 32 inches.

Figure 11:
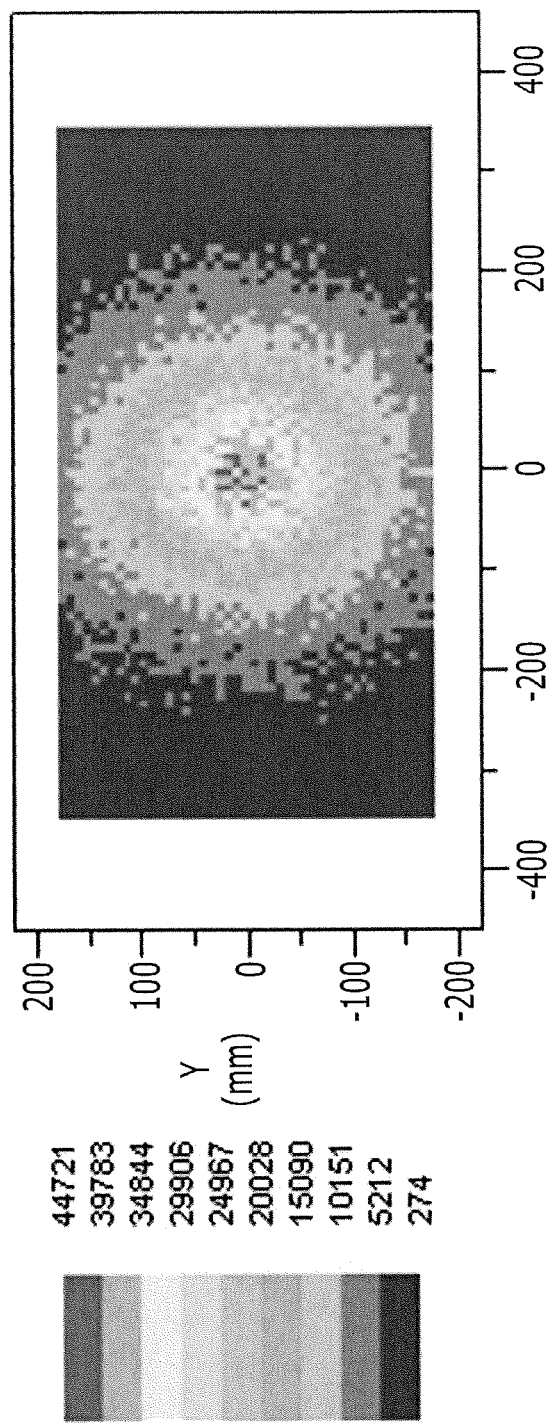
FIG. 11 is a diagram illustrating a simulation in which LED light of an ultra-intensity LED package having a light emitting surface is diffused, where an optical structure is not applied, but only a diffusion plate is applied.
Figure 12:
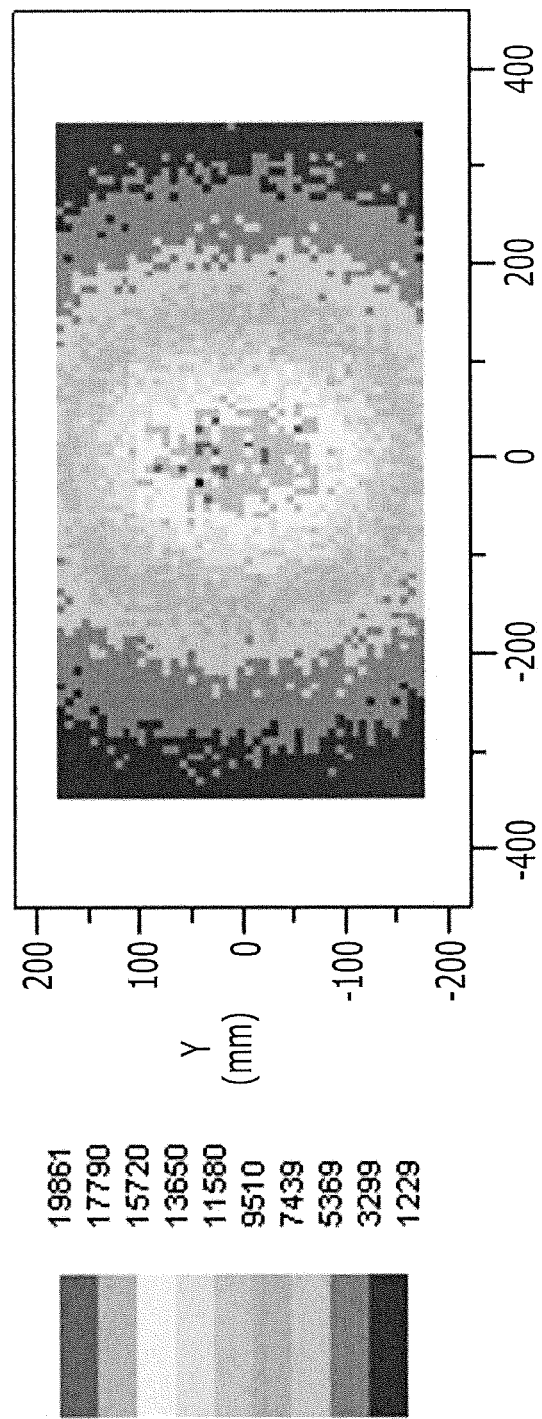
FIGS. 12 to 14 are diagrams illustrating simulations in which LED light of an ultra-intensity LED package having a light emitting surface is diffused, where one circular cone shaped optical structure having a diameter of 40 millimeters (mm) is applied together with the diffusion plate on the LED package.
Figure 13:
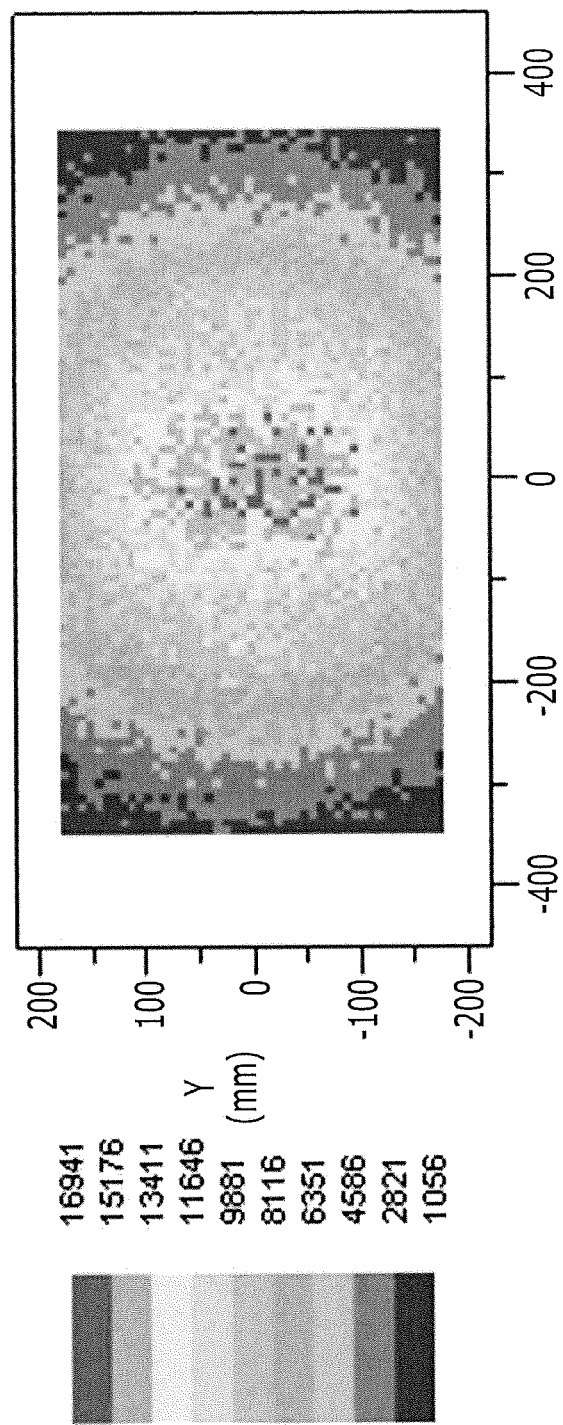
Figure 14:
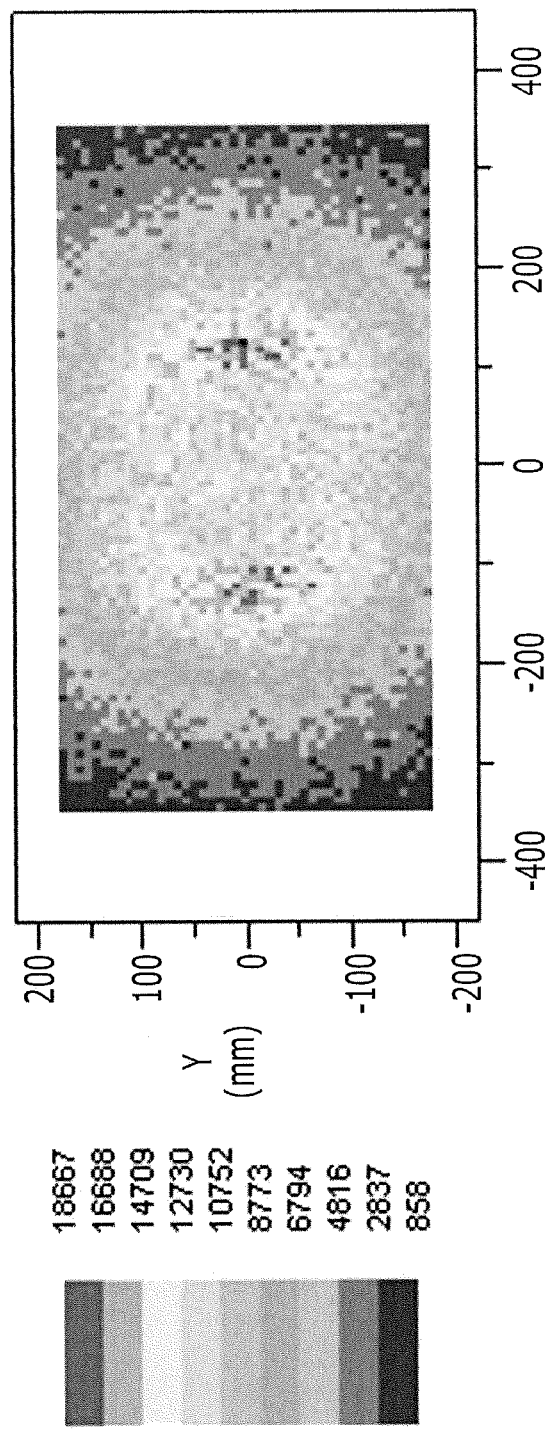

FIG. 11 illustrates application of only a diffusion plate on the LED package, where an optical structure is omitted. FIGS. 12 to 14 illustrate one circular cone shaped optical structure having a diameter of 40 mm is applied together with the diffusion plate on the LED package. FIG. 12 illustrates a design angle of a reflective surface is 15 degrees, FIG. 13 illustrates a design angle of a reflective surface is 30 degrees, and FIG. 14 illustrates a design angle of a reflective surface is 45 degrees.

Referring to FIG. 11 in which only a diffusion plate is applied to the LED package, an illumination is very high at the center and sharply decreased as it approaches the peripheral portion which shows that the light is concentrated only at the center. In contrast, when the circular cone shaped optical structure is applied, as illustrated in FIGS. 12 to 14, an illumination of the center is decreased so as to be half or less of the illumination when the optical structure is not applied (FIG. 11). In FIGS. 12 to 14, the illumination is gradually decreased as it approaches the peripheral portion and the light is diffused even to an edge at the peripheral portion which is very far from the center.

However, the diffusion aspect varies depending on the design angle of the reflective surface. FIG. 14 shows a portion having a higher illumination is divided at both sides of the center. In contrast, FIG. 12 and FIG. 13 show that 15 degree and 30 degree of design angle generates a portion having a higher illumination is disposed at the center. It may be desired to have a portion having a higher illumination disposed at the center (FIG. 12 and FIG. 13) than a portion having a higher illumination is divided and disposed at opposing sides of the center (FIG. 14), but a diffusion aspect may be chosen according to a design of the display device. When a plurality of LED chips and a plurality of optical structures are provided at a certain interval, light which is diffused by adjacent optical structures is added, so that uniform light diffusion distribution may be obtained.

Hereinafter, a result of simulating that the light is diffused using an optical structure having a uniform slope of the reflective surface and the light is diffused by an optical structure having a variable slope of the reflective surface will be described with reference to FIGS. 15 to 18. Similarly to the above-described simulation, LED light of an ultra-intensity LED package having a light emitting surface having a length W of 12.5 mm and a width D of 10 mm is diffused to an area corresponding to a display panel size of approximately 32 inches.

Figure 15:
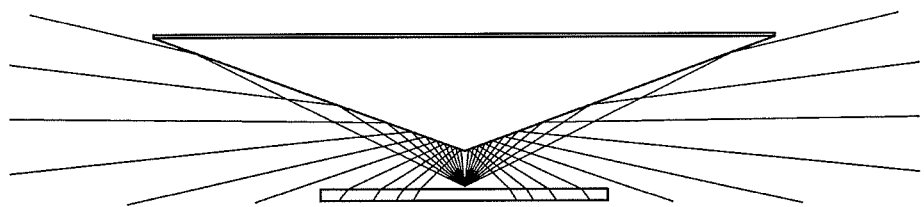
FIG. 15 is a diagram illustrating a light traveling route when a reflective surface of an optical structure is planar.
Figure 16:
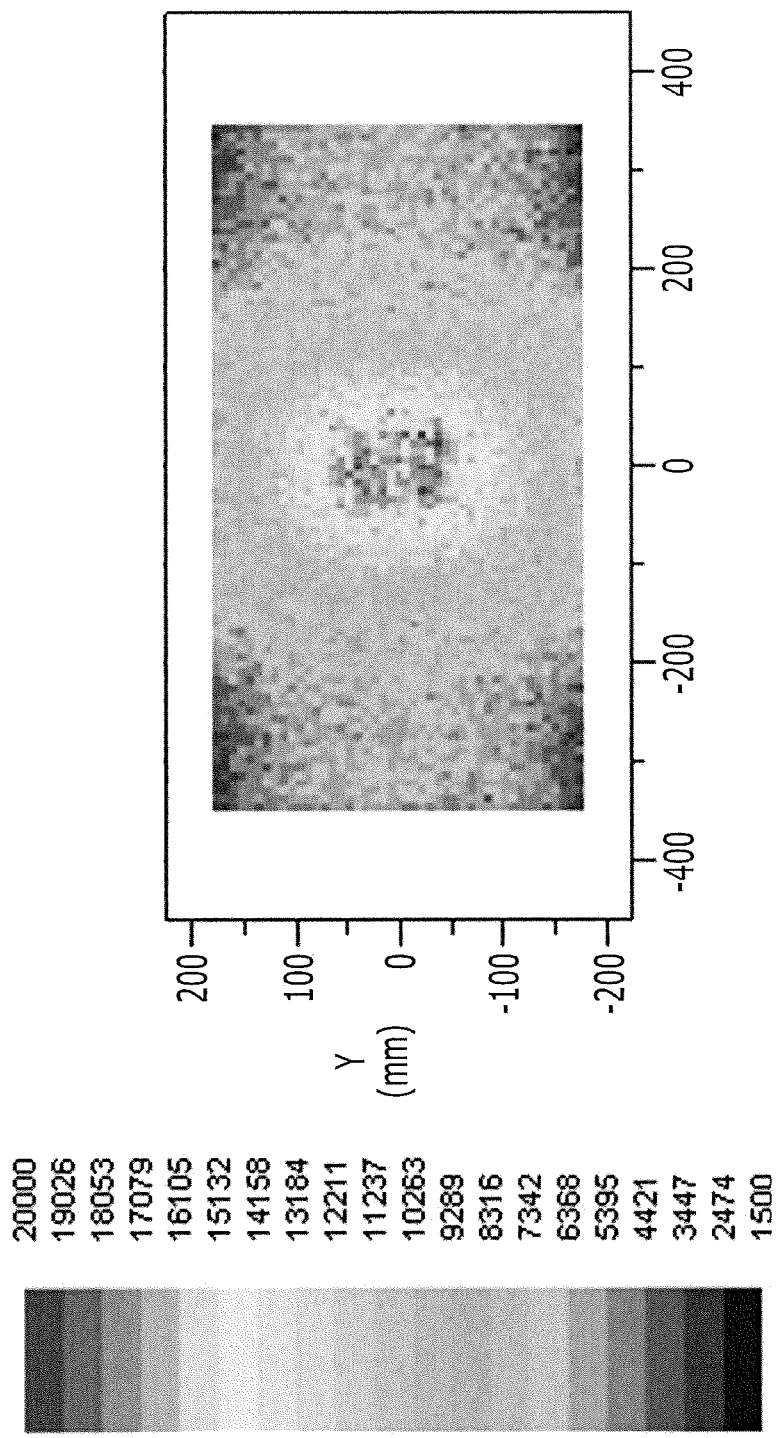
FIG. 16 is a diagram illustrating a simulation in which LED light is diffused when the optical structure of FIG. 15 is applied.

FIG. 15 is a diagram illustrating a light traveling route when a reflective surface of an optical structure is planar and FIG. 16 is a diagram illustrating a simulation in which the LED light is diffused when the optical structure of FIG. 15 is applied. The optical structure has a circular cone shaped body and a slope of the reflective surface is not changed from an upper surface to a lower portion thereof, so as to be constant. As shown in FIG. 15, while the light emitted from the LED may be considered reflected so as to travel approximately in a horizontal direction in accordance with the position of the reflective surface, the light is upwardly or downwardly with respect to the horizontal direction in most positions of the reflective surface. When the diffusion of the light is simulated, as illustrated in FIG. 16, even though the light is diffused to the peripheral portion (e.g., farthest from the center), the diffusion is not sufficient, so that an illumination at the center is significantly higher than an illumination at the peripheral portion. In other words, the light is concentrated at the center but does not spread far and wide.

Figure 17:
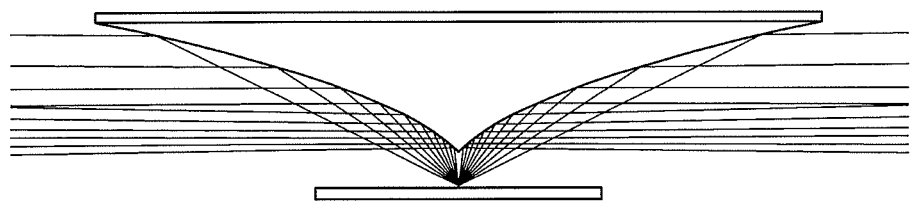
FIG. 17 is a diagram illustrating a light traveling route when a reflective surface of the optical structure is non-planar.
Figure 18:
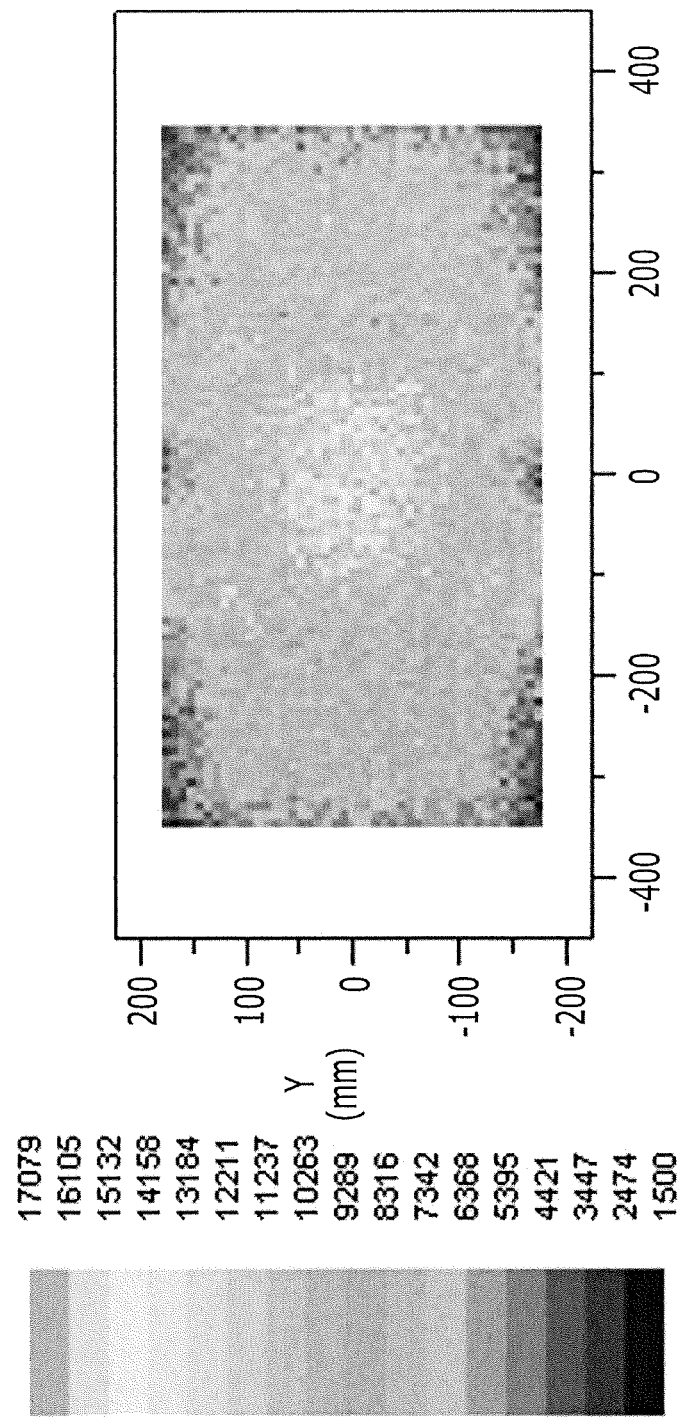
FIG. 18 is a diagram illustrating a simulation in which LED light is diffused when the optical structure of FIG. 17 is applied.

FIG. 17 is a diagram illustrating a light traveling route when a reflective surface of the optical structure is non-planar and FIG. 18 is a diagram illustrating a simulation in that the LED light is diffused when the optical structure of FIG. 17 is applied. Differently from the circular cone shaped optical structure of FIG. 15, the optical structure of FIG. 17 has an external shape which is similar to the circular cone shape but the absolute value of the slope of the reflective surface is increased in a direction towards the lower portion thereof. The slope of the reflective surface is designed so as to be appropriately changed. In one exemplary embodiment, for example, the reflective surface is disposed such that the design angle α satisfies approximately (90−θ)/2 at all positions of the reflective surface (here, θ refers to a beam angle) and the light reflected by the reflective surface may travel in a substantially horizontal direction (e.g., not upwardly or downwardly with respect to true horizontal) as illustrated in FIG. 17. As a result, as illustrated in FIG. 18, the light concentrated to the center is significantly reduced and the illumination is less deteriorated to the peripheral portion so that the LED light which passes through the diffusion plate facing the light emitting surface of the LED package may be more evenly diffused.

What is claimed is:

1. An optical structure comprising:
   a body facing a light emitting surface of a light emitting diode package, comprising a portion protruding toward the light emitting surface of the light emitting diode package, wherein a surface of the protruding portion faces the light emitting surface and forms a reflective surface of the optical structure; and
   legs which are elongated from a periphery of the body toward the light emitting diode package to support the body to be spaced apart from the light emitting diode package, between which is defined a space through which light reflected by the protruding portion passes, the legs defining openings which expose the space to outside the optical structure and via which the light reflected by the protruding portion passes to outside the optical structure.

2. The optical structure of claim 1, wherein:
the reflective surface is symmetrical with respect to a vertical central axis of the optical structure.

3. The optical structure of claim 2, wherein:
the reflective surface is a surface of which an absolute value of a slope increases in a direction towards a distal end of the protruding portion.

4. The optical structure of claim 3, wherein:
the reflective surface defines a relationship between a beam angle θ of the light and a design angle α of the reflective surface which satisfies the following Equation:

$$(60-\theta)/2 \leq \alpha \leq (120-\theta)/2$$

wherein
the beam angle θ of the light is defined as an angle between a straight line which is directed to an arbitrary point on the reflective surface from a center of the light emitting surface, and the vertical central axis of the optical structure, and
the design angle α of the reflective surface is defined as an angle between a straight line which is directed from the arbitrary point of the reflective surface, and a line tangent to the reflective surface at the arbitrary point.

5. The optical structure of claim 2, wherein:
the reflective surface is a surface of which an absolute value of a slope is one of constant or increases, and then decreases, in a direction towards a distal end of the protruding portion.

6. The optical structure of claim 5, wherein:
in a section of the surface of the reflective surface where the absolute value of the slope of the reflective surface is one of constant or increases, the reflective surface defines a relationship between a beam angle θ of the light and a design angle α of the reflective surface which satisfies the following Equation:

$$(60-\theta)/2 \leq \alpha \leq (120-\theta)/2$$

wherein
the beam angle θ of the light is defined as an angle between a straight line which is directed to an arbitrary point on the reflective surface from a center of the light emitting surface, and the vertical central axis of the optical structure, and
the design angle α of the reflective surface is defined as an angle between a straight line which is directed from the arbitrary point of the reflective surface from the center of the light emitting surface, and a line tangent to the reflective surface at the arbitrary point.

7. The optical structure of claim 1, wherein:
the reflective surface has a structure of a Fresnel lens.

8. The optical structure of claim 1, wherein:
the body comprises:
an optical reflective material combined with a resin, or
a resin body comprising a protruding portion and the optical reflective material on an external surface of the protruding portion of the resin body.

9. The optical structure of claim 1, wherein:
a reflectance of the reflective surface is 60% or higher.

10. The optical structure of claim 1, wherein:
in a cross-section, an upper surface of the body opposing a distal end of the protruding portion is curved or uneven.

11. The optical structure of claim 1, wherein:
in a cross-section of the body,
a vertical central axis is defined at a center of the body with respect to first and second directions perpendicular to each other and the vertical central axis, and
a first direction width of a first direction vertical plane which is coincident with thea vertical central axis is smaller than a second direction length of a second direction vertical plane which is coincident with the vertical central axis.

12. The optical structure of claim 11, wherein:
the reflective surface is symmetrical along the first direction vertical plane and is symmetrical along the second direction vertical plane, with respect to the vertical central axis.

13. The optical structure of claim 12, wherein:
the reflective surface is a surface of which an absolute value of a slope increases in a direction towards a distal end of the protruding portion.

14. The optical structure of claim 12, wherein:
the reflective surface is a surface of which an absolute value of a slope in the first horizontal direction is one of constant or increases, and then decreases, in a direction towards a distal end of the protruding portion, and
in the second direction is one of constant or increases and then decreases, or is constant or increases, then decreases and then is constant, in the direction towards the distal end of the protruding portion.

15. The optical structure of claim 14, wherein:
in a section of the surface of the reflective surface where the absolute value of the slope of the reflective surface is one of constant or increases, the reflective surface defines a relationship between a beam angle θ of the light and a design angle α of the reflective surface which satisfies the following Equation:

$$(60-\theta)/2 \leq \alpha \leq (120)-\theta/2$$

wherein
the beam angle θ of the light is defined as an angle between a straight line which is directed to an arbitrary point on the reflective surface from a center of the light emitting surface, and the vertical central axis of the optical structure, and
the design angle α of the reflective surface is defined as an angle between a straight line which is directed from the arbitrary point of the reflective surface, and a line tangent to the reflective surface at the arbitrary point.

16. The optical structure of claim 11, wherein:
the reflective surface has a structure of a Fresnel lens.

17. The optical structure of claim 11, wherein:
the body comprises:
an optical reflective material combined with a resin, or
a resin body comprising a protruding portion and the optical reflective material on an external surface of the protruding portion of the resin body, and
a reflectance of the reflective surface is 60% or higher.

18. A direct type light emitting diode backlight unit, comprising:
a substrate;
a light emitting diode package on the substrate;
an optical structure which is disposed above the light emitting diode package so as to be spaced apart from the light emitting diode package; and an optical sheet which is disposed above the optical structure;

wherein the optical structure comprises:
- a body facing a light emitting surface of the light emitting diode package, comprising a portion protruding toward the light emitting surface of the light emitting diode package, wherein a surface of the protruding portion faces the light emitting surface and forms a reflective surface of the optical structure; and
- legs which are elongated from a periphery of the body and toward the light emitting diode package to diode package, between which is defined a space through which light reflected by the protruding portion passes, the legs defining openings which expose the space to outside the optical structure and via which the light reflected by the protruding portion passes to outside the optical structure.

19. The direct type light emitting diode backlight unit of claim 18, wherein:
  in a cross-section of the body,
    a vertical central axis is defined at a center of the body with respect to first and second directions perpendicular to each other and the vertical central axis, and
    a first direction width of a first direction vertical plane which is coincident with the vertical central axis is smaller than a second direction length of a second direction vertical plane which is coincident with the vertical central axis.

20. The direct type light emitting diode backlight unit of claim 19, further comprising a plurality of light emitting diode packages,
  wherein one optical structure overlaps the plurality of light emitting diode packages.

21. The direct type light emitting diode backlight unit of claim 18, wherein:
  the optical structure is mounted on the substrate via the legs.

\* \* \* \* \*